(12) United States Patent
Reinertsen

(10) Patent No.: US 8,595,797 B2
(45) Date of Patent: Nov. 26, 2013

(54) ENFORCING WEB SERVICES SECURITY THROUGH USER SPECIFIC XML SCHEMAS

(76) Inventor: Lars Reinertsen, London (GB)

( * ) Notice: Subject to any disclaimer, the term of this patent is extended or adjusted under 35 U.S.C. 154(b) by 190 days.

(21) Appl. No.: 13/073,611

(22) Filed: Mar. 28, 2011

(65) Prior Publication Data

US 2012/0254945 A1    Oct. 4, 2012

(51) Int. Cl.
*H04L 63/08* (2013.01)
*G06F 21/6218* (2013.01)
*G06F 21/10* (2013.01)

(52) U.S. Cl.
USPC .................................. 726/4; 726/21; 726/27

(58) Field of Classification Search
USPC ............. 726/4, 5, 9; 711/118; 705/21, 30, 44; 718/105; 713/201
See application file for complete search history.

(56) References Cited

U.S. PATENT DOCUMENTS

| | | | |
|---|---|---|---|
| 7,464,226 B2 | 12/2008 | Reinersten | |
| 8,468,608 B1* | 6/2013 | Hernacki et al. | 726/27 |
| 2003/0078032 A1* | 4/2003 | Pei et al. | 455/411 |
| 2005/0114712 A1* | 5/2005 | Devine et al. | 713/201 |
| 2005/0273849 A1* | 12/2005 | Araujo et al. | 726/12 |
| 2006/0041669 A1 | 2/2006 | Bemmel et al. | |
| 2006/0230407 A1* | 10/2006 | Rosu et al. | 718/105 |
| 2007/0198777 A1* | 8/2007 | Reinertsen | 711/118 |
| 2008/0263652 A1* | 10/2008 | McMurtry et al. | 726/9 |
| 2009/0007234 A1* | 1/2009 | Birger et al. | 726/3 |
| 2010/0024012 A1* | 1/2010 | Devine et al. | 726/5 |
| 2010/0121726 A1* | 5/2010 | Coulter et al. | 705/21 |
| 2010/0306772 A1* | 12/2010 | Arnold et al. | 718/1 |
| 2011/0208801 A1* | 8/2011 | Thorkelsson et al. | 709/203 |
| 2013/0111576 A1* | 5/2013 | Devine et al. | 726/11 |

OTHER PUBLICATIONS

Nordbotten, N.A., "XML and Web Services Security Standards," Communications Surveys & Tutorials, IEEE, vol. 11, No. 3, pp. 4,21, 3rd Quarter 2009.*
Brinhosa, R.B.; Westphall, C.B.; Westphall, C.M., "A Security Framework for Input Validation," Emerging Security Information, Systems and Technologies, 2008. SECURWARE '08. Second International Conference on , vol., No., pp. 88,92, Aug. 25-31, 2008 doi: 10.1109/SECURWARE.2008.67.*
Brinhosa, R.B.; Westphall, C.M.; Westphall, C.B., "Proposal and development of the Web services input validation model," Network Operations and Management Symposium (NOMS), 2012 IEEE , vol., No., pp. 643,646, Apr. 16-20, 2012 doi: 10.1109/NOMS.2012.6211976.*
LAYER7 Technologies, White Paper: XML Threats and Web Services Vulnerabilities: Understanding Risk and Protection; Copyright© 2005 (www.layer7tech.com), pp. 1-6.
Claudio Agostino Ardagna, et al., "A Web Service Architecture for Enforcing Access Control Policies," *Departimento di Tecnologie dell'Informazione*, Universita degli Studi di Milano 26013 Crema, Italy, VODCA 2004 Preliminary Version, pp. 1-15.

* cited by examiner

*Primary Examiner* — Luu Pham
*Assistant Examiner* — Vu V Tran
(74) *Attorney, Agent, or Firm* — Gordon & Rees LLP

(57) ABSTRACT

A method of enforcing web security, by: (a) receiving an incoming request; (b) applying a plurality of XML customized schemas to the incoming request, and thereby: (c) simultaneously validating the incoming request and determining whether the incoming request is authorized; and then, (d) (i) processing the incoming request if the incoming request is both valid and authorized, (ii) sending the incoming request to an authenticator if the incoming request is valid but not authorized, or (iii) ceasing operation on the incoming request if the incoming request is not valid.

8 Claims, 2 Drawing Sheets

US 8,595,797 B2

ENFORCING WEB SERVICES SECURITY THROUGH USER SPECIFIC XML SCHEMAS

TECHNICAL FIELD

The present invention relates primarily to systems for enforcing web security. In addition, the present invention also relates to systems for reducing computer energy usage by reducing the number of calculations required to process incoming requests, and to systems that facilitate virtual servers.

BACKGROUND OF THE INVENTION

Computer systems can be attacked and crashed when they receive malicious code. A common attack is to send the computer system code that can't be executed or processed (such as code that causes the computer processing to fall into an infinite loop, or code that is otherwise provided in an invalid format).

Traditionally, computer systems look to see whether the code they receive in incoming requests is: (i) "authentic" and (ii) "authorized". Determining whether the code is "authentic" involves determining whether the code is sent from a recognized source (i.e. determining who is sending the incoming request). Determining whether the code is "authorized" involves determining whether the person or entity sending the request is actually permitted to make this request of the system.

Traditionally, internet security has been accomplished by making sure that an incoming request is both authentic and authorized. (i.e.: determining who is sending this request and whether they are authorized to ask for what they're asking for). But one major weakness remains. If the code/request that is initially received is in an invalid format, the computer system can be crashed prior to the system even analyzing whether the request is authentic or authorized. Security systems do exist that validate code (i.e.: determine if it is in a proper format for processing prior to actually processing it). However, this validation step simply adds a third step onto the front end of the system as the code must be separately validated and then authenticated and then authorized. This third (validation) step expends considerable computer resources.

What is instead desired is a system in which validation, authentication and authorization could all be achieved, but not as three computationally separate steps that each separately consume valuable computer resources.

To date, standard "cloud" computing is simply separating application processing into separate remote locations. What is instead desired is "green" computing in which the total amount of energy used in actually processing a software (or hardware) application is reduced. This reduction in energy is best achieved by reducing the total amount of calculations performed in carrying out the software applications. As will be explained herein, the present invention advantageously reduces the total amount of calculations performed in carrying out software applications. In addition, the present invention avoids the problem of application specific servers sitting powered up and idle waiting to process incoming user requests. As will be explained, this is done in part by using servers that are not application specific. Thus, the present invention permits true "green" (i.e.: energy saving) computing.

SUMMARY OF THE INVENTION

The present invention provides a method of enforcing web security, comprising: (a) receiving an incoming request; (b) applying a plurality of XML schemas to the incoming request, and thereby: (c) simultaneously validating the incoming request and determining whether the incoming request is authorized; and then, (d) (i) processing the incoming request if the incoming request is both valid and authorized, (ii) sending the incoming request to an authenticator if the incoming request is valid but not authorized, or (iii) ceasing operation on the incoming request if the incoming request is not valid.

An important advantage of the present invention is that both validation and authentication are accomplished as one combined step (which is done as early as possible). Thus, rejected requests can be rejected quickly with little processing overhead being used. Rejections may be made for either invalid data (i.e.: validation) or for unauthorized operations (i.e.: authorization). An important advantage of early validation of the incoming request is that the back end of the system is protected against malicious code and other types of attacks.

Validation is preferably accomplished by determining if the incoming request satisfies the requirements of the applied XML schema. (For example, determining if the incoming request has the permitted structure or syntax). The XML schemas used in validating and authorizing the incoming requests may be user-specific (and developed from the particular users credentials), or a default XML schema may be used when the user is not initially authenticated. The schemas may optionally be tagged with operations that are to be performed if the schema is violated. An typical example is if a request from an unknown user violates a schema, the user should be passed on to an authentication mechanism; After being successfully authenticated, other schemas may be brought to bear on the request. Another example is that a request should be deleted if it violates the schema.

In preferred aspects, approved incoming requests are sent to one or more servers which are not application specific servers. This advantageously allows more applications to share the same physical server hardware while still keeping them separate from one another. In addition, this also allows approved incoming requests to be sent to different servers. Since these servers are preferably non-application specific, the different servers can advantageously be brought on and off line at different times per the computational load requirements. Running on shared hardware with any number of applications sharing the same physical platform, additional devices may be powered up or down automatically to keep utilization high. In other words, application specific servers need not be sitting idle consuming energy when not needed. Alternatively, since there need not be any application-specific servers, all approved client requests can be routed to the same server when the processing demand is small. Preferably as well, the incoming request contains or calls up procedural logic such that a plurality of incoming requests emulate an application when the incoming request is sent to the server which is not an application specific server. In the case of procedural logic being called up, the logic will be screened just like any other incoming request. For example, actions carried out on behalf of a user can be screened with the stylesheets assigned to that user. Alternatively, if the user is unknown/unauthenticated, default screening in accordance with the present method can be used.

In an alternate aspect, the present invention comprises a computer platform for enforcing web security, comprising: (a) a first module for receiving an incoming request and applying a plurality of XML schemas to the incoming request thereby simultaneously validating the incoming request and determining whether the incoming request is authorized; (b) a second module for authenticating the incoming request if the incoming request has not been authorized by the first module; and (c) at least one server for processing the incoming request after the incoming request has been validated and authorized.

In operation, the first (validation/authorization) module sends the input request to the server if the incoming request is both valid and authorized, or to the second (authentication) module if the incoming request is valid but not authorized. The second (authentication) module then sends the input request back to the first (validation/authorization) module after the incoming request has been authenticated.

In this second aspect of the invention, the computer platform operates as a "commoditized computing service" available over a network such that applications running therein would essentially be virtualized. There would be an appearance of an integrated application running on the server, but there would in fact be none. Advantageously, the computer platform need not have any application specific logic. Instead, the incoming requests contain their own required logic. This logic may include requests to call up more logic from a database, so that small requests (in terms of characters), may still involve large and complex operations. As a result, the requests can be written in pieces of instruction that together amount to a high level machine language. (i.e.: a machine language in the sense that the server is only capable of executing these instructions and nothing else, which can be combined into large and complex structures). These instructions can be XML formatted and can therefore be effectively screened with XML stylesheets (in accordance with the present invention). Specifically, these XML stylesheets can identify any detail of the instructions and determine whether or not it follows the desired format and contains only permitted content Tailoring the XML stylesheets to different users allows the different users to pass different instructions to the server(s) and have them executed. Using XML stylesheets in this way permits incoming requests to be rejected for having an improper format or for being disallowed based upon the user who sent the request (all in one step). In addition, the hardware can be optimized for accelerating the execution of the incoming requests.

DETAILED DESCRIPTION OF THE DRAWINGS

Figure 1:
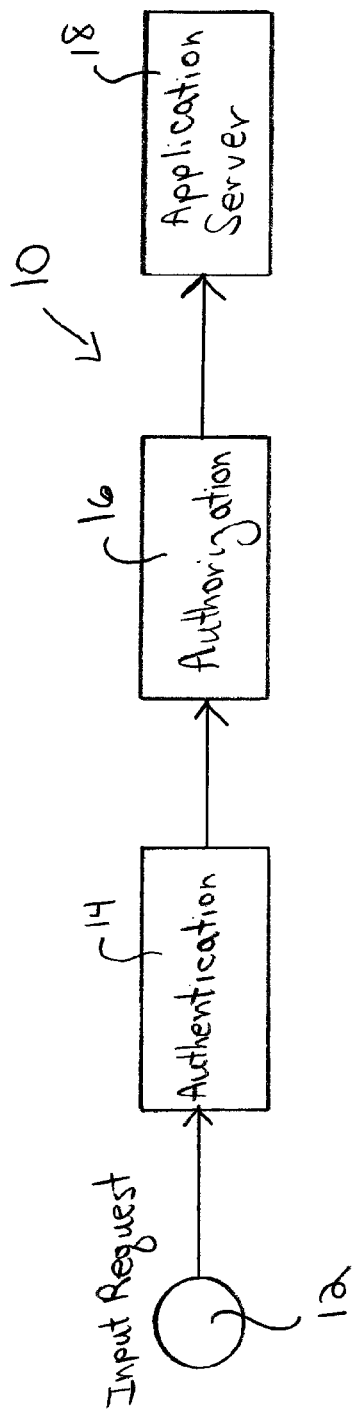
FIG. 1 is a flow diagram of a simple prior art web security system.

FIG. 1 is a flow diagram of a simple prior art web security system 10. In this system, an incoming request 12 is first passed through an authenticator 14. Authenticator 14 then determines whether incoming request 12 is sent from a recognized source. Simply put, authenticator 14 determines who is sending incoming request 12. Next, if authenticator 14 determines the incoming request 12 to be authentic, the incoming request is then passed to authorizer 16. Authorizer 16 then determines whether the person or entity making incoming request 12 is actually permitted to make this request of the system. Simply put, authorizer 16 determines whether incoming request 12 is authorized. Next, if authorizer 16 determines the incoming request 12 to be authorized, the incoming request is then passed along to application server 18 for processing.

A common problem with the system shown in FIG. 1 is that the content of the incoming requests 12 are not validated prior to being sent through to application server 18. As a result, a malicious code attack can be launched on system 10 simply by sending code in an invalid format (which may then cause system 10 to crash). Such malicious code could potentially pass through and reach the "back end" of the system (i.e.: application server 18), doing considerable damage.

Figure 2:
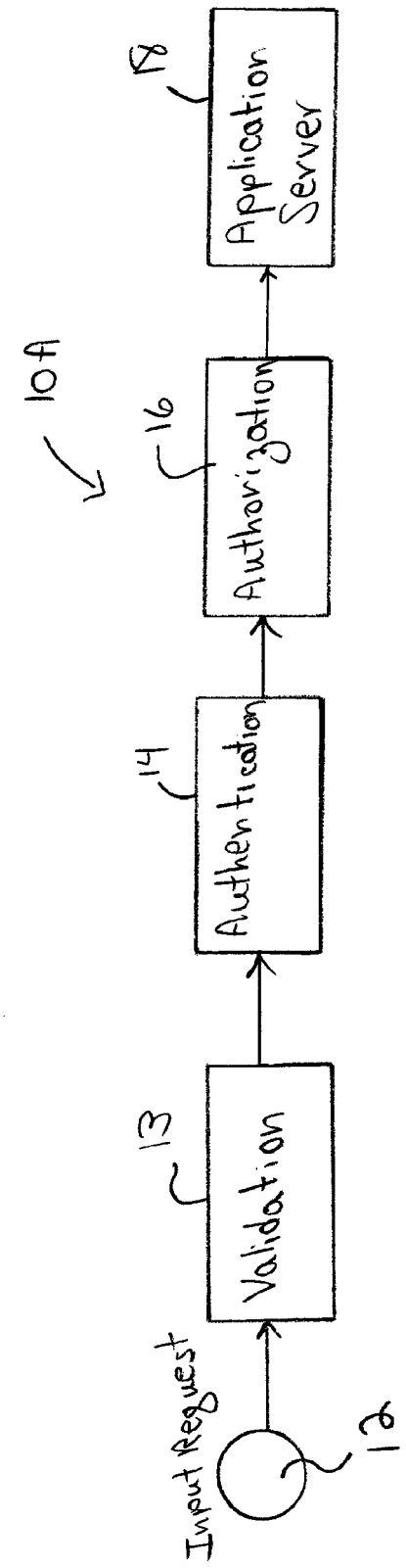
FIG. 2 is a flow diagram of a more advanced prior art web security system.

As a result, more advanced prior art web security systems as seen in FIG. 2 have been used. System 10A functions basically the same as system 10 (in FIG. 1). The only difference is that system 10A now includes a validator 13. As can be seen, the incoming request 12 is first received into validator 13. Validator 13 simply operates to determine whether the format of incoming request 12 is valid. For example, it determines whether the incoming request 12 has the proper structure, syntax and content. After incoming request 12 has been validated by validator 13, it then is processed the same as was shown in the system of FIG. 1.

Although the system of FIG. 2 is more secure than the system of FIG. 1, another common problem remains. Specifically, the system of FIG. 2 requires a considerable amount of computer processing energy as three separate steps are now performed prior to the incoming request even reaching server 18 for processing.

Figure 3:
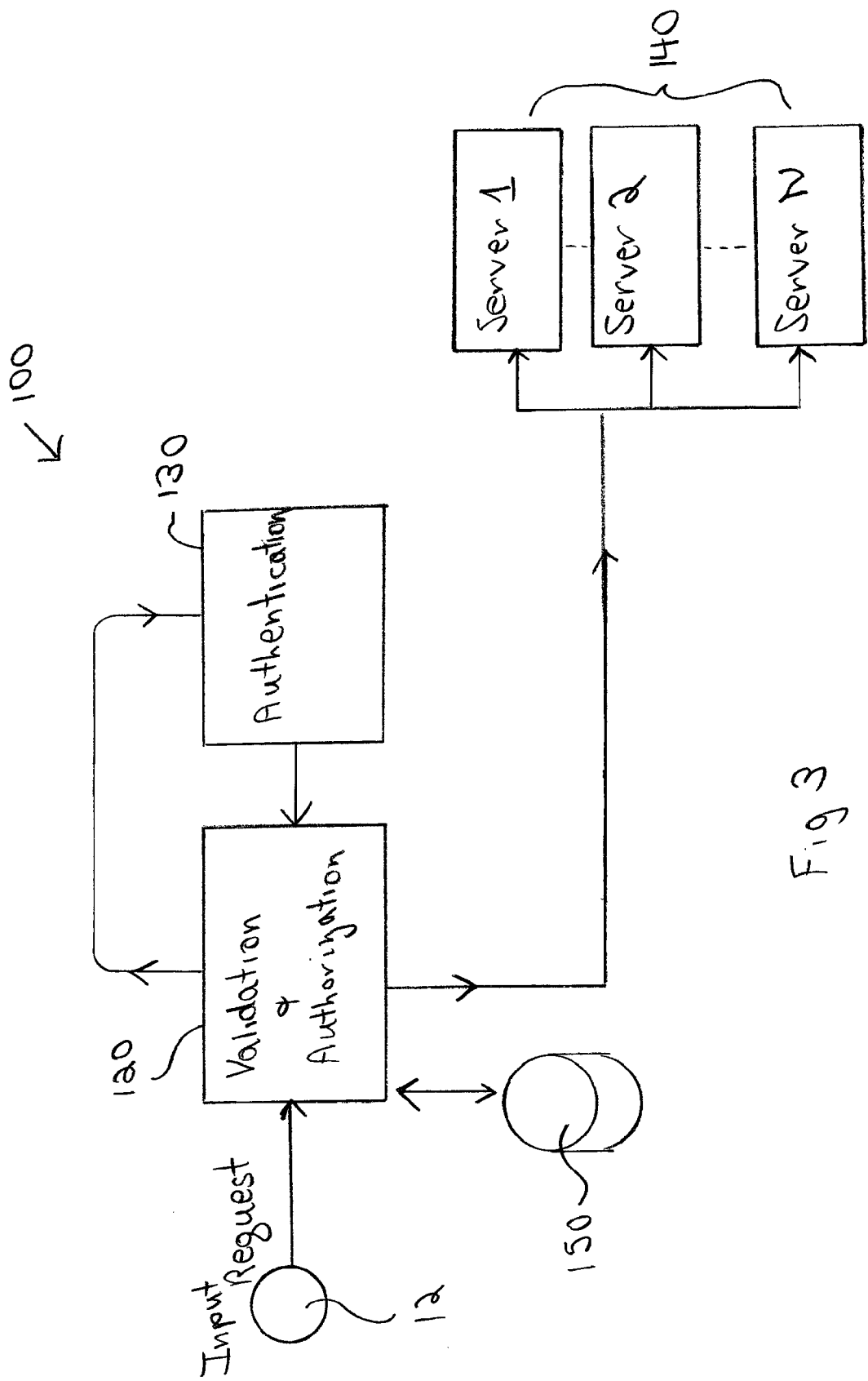
FIG. 3 is a flow diagram of the present web security system.

FIG. 3 illustrates a preferred embodiment of the present web security system 100, being a computer platform for enforcing web security, as follows. System 100 comprises a first (validation/authorization) module 120, a second (authorization) module 130 and one or more servers 140. First module 120 simultaneously performs the validation and authorization steps. Specifically, first module 120 receives incoming request 120 and applies a plurality of XML schemas to the incoming request thereby simultaneously validating the incoming request and determining whether the incoming request is authorized. Second module 130 authenticates the incoming request if the incoming request has not already been authorized by the first module. Server(s) 140 process incoming request 12 after incoming request 12 has been validated and authorized by first module 120. Server(s) may be a single application server. However, server(s) 140 are preferably not application specific servers.

In operation, first module 120 sends input request 12 to server(s) 140 if incoming request 12 is both valid and authorized. Alternatively, first module 120 sends input request 12 to second module 130 if the incoming request is valid but not authorized. Specifically, first module 120 may first apply a default XML schema (only for unauthenticated requests or where no other schema is retrievable). If the incoming request 12 fails this default schema, the request will be deleted. However, if the incoming request 12 passes this default schema, first module 120 may then apply a user-specific XML schema (i.e.: once the source/user of the request has been recognized). If the XML schema applied by first module 120 determines the incoming request to be both valid and authorized, the incoming request may then be forwarded directly to server(s) 140 for processing. Alternatively, if the XML schema applied by first module 120 determines the incoming request to be valid but does not determine whether it is authorized, then the input request may instead be sent to second module 130 for authorization. Second module 130 then applies an XML schema to determine whether the request is authentic. If the incoming request is determined to be authentic, then second module 130 sends input request 12 back to first module 120. At that time, the request can be send from first module 120 directly to server(s) 140. Alternatively, if the request can not be authenticated by second module 130, then processing of the request may be stopped right at second module 130.

The default schema applied by first module 120 will typically be more rigorous than merely enforcing XML well-formedness. However, it is to be understood that the present invention encompasses simple default schema that do not merely enforce XML well-formedness. In addition, it is to be understood that the present invention also permits a user to upgrade his/her/its authentication, and thus the XML schema applied by second module 130 may be configurable.

Lastly, a database 150 may also be provided for caching results of the application of the XML schemas on incoming request 12. As a cache, database 150 may contain the signature combinations of all requests and the schema applied to them (witch can be coupled with their outcomes). Matches may be sought in parallel with processing, with the first match found controlling. For example, if a search of database 150 produces a response before the processing in modules 120 and 130, the processing can be stopped and the database response used, or vice versa. This feature is very advantageous in that if the incoming request (or one just like it) has not been processed before, the result is inserted into database 150. This caching function will speed up processing of repeat traffic.

In operation, different incoming requests 12 may be sent to different servers 140. Since servers 140 are preferably not application specific, different servers 140 may be brought on and off line at different times per computational load requirements.

The present invention also provides a method of enforcing web security, as follows. An incoming request 12 is received into first module 120. First module 120 then applies a plurality of XML schemas to incoming request 12. The application of these plurality of XML schemas to incoming request 12 simultaneously validates the incoming request and determining whether the incoming request is authorized. Thus, an important advantage of the present system is that validation and authorization are done together as one step (as opposed to being done sequentially as illustrated in the prior art systems of FIGS. 1 and 2). This substantially reduces computer computations, and their associated energy usage.

Next, one of three things occur. 1) The incoming request 12 can be processed, if the incoming request is both authenticated and valid according to schemas associated with the user making the request (i.e.: incoming request 12 is sent directly from first module 120 to server 140). 2) The incoming request can be sent to the second module (authenticator 130) if the incoming request is unauthenticated and has failed validation on a schema that decrees authentication. 3) Operations on the incoming request may be immediately ceased if the incoming request is determined (by first module 120) to either unauthenticated and not valid according to applicable schema that decrees deletion of the request (and not allowing the request to proceed to authentication at 130), or authenticated and not valid according to schemas associated with the user making the request.

In accordance with the present invention, incoming request 12 may be an XML document. This document (or other form of incoming request) may be validated by checking for conformance with its associated XML schema. For example, the XML schema may determine the elements that must or may be included in the incoming request and their permitted structure. In addition, the structure of incoming request 12 may be analyzed to determine whether it uses a regular expression syntax. Other approaches to validation include determining the way in which character data is interpreted (e.g.: as a number, date, URL, Boolean operator, etc.) In practice, the schema validators that are used may simple be integrated with an XML parser. Preferably, the pieces of XML schema that are applied to the incoming request may be assigned priorities. For example, the XML schema assigned to the user id take priority over other XML schema.

As stated above, applying a plurality of XML schema to incoming request 12 may comprise: either (i) applying at least one default schema to the incoming request; or (ii) applying at least one user-specific schema to the incoming request. A user-specific schema is a collection of schema objects that may be used to control the user requests (and make sure they are authorized and contain only valid data). Each object controlling one or more aspects of the XML in the users requests. A collection of schema objects of the same schema type and priority may be assembled together in a single schema file for convenience and speed of processing. A default (or unauthenticated) schema is a collection of schema files that may be used to control the requests of an unknown user (and make sure they are authorized and contain only valid data). The default schema is likely to be more restrictive than schemas covering individual users, as authenticated users will typically be authorized to perform more operations.

In accordance with the preferred method, sending the incoming request 12 to authenticator 130 if the incoming request is valid, and not authorized comprises either: (a) processing incoming request 12 if the incoming request is determined to be authentic; or (b) ceasing operation on the incoming request if the incoming request is determined to not be authentic. Specifically, in option "(a)" above, incoming request 12 is sent from validation/authentication module 120 directly to server(s) 140 for processing. In option "(b)" above, incoming request 12 is stopped at validation/authentication module 120, and never reaches server(s) 140. If authenticator 130 determines that incoming request 12 is authentic, then incoming request 12 is sent back from authenticator 130 to validator/authorizer 120. At this time, the request is processed using the same method described above (i.e.: a plurality of XML schemas are applied to the incoming request.)

Authorization will likely remain a step in the process even if there is no authentication. This is because unauthenticated requests may be permitted to access freely available services. If failure occurs on the unauthenticated schema and the user is unauthenticated, the user may be passed on to the authentication mechanism to establish identity and credentials. Afterwards, the request can be re-checked with the user schema. Once the user has been authenticated, the same user schema will be applied to all their subsequent requests.

The present invention is not limited to any one system of applying XML schema to validate or authorize the incoming request. Rather, satisfying the requirements of the applied XML schema may be done in various ways, including the incoming request providing appropriate credentials and/or a user id. Such credentials may include group and role memberships. In preferred approaches, the user's credentials can be used to create one or more XML schemas (that will be used against all requests from that user).

The present system has numerous advantages, including but not limited to the following. First, every part of an incoming request can be schema validated. (i.e.: no incoming instructions can be executed unless they are first cleared through validation). Second, new code can be easily generated at runtime. Third, it is not necessary to trust the application running to correctly apply the required security. For example, there is no longer an application between the security layer and what is being carried out on behalf of the user. With the present invention, security can now be applied directly to every single operation carried out. Therefore, code can not be hidden in "trap doors" within a application. With the present system, the application has been broken apart, thus eliminating the possibility of hiding malicious code therein. This can straightforwardly be tightened to amount to "white list" execution control, where only identified and approved code statements can be executed; rather than the more usual (for anti-virus software etc.) "black list" where only the identified statements are blocked.

Further advantages of breaking applications apart (in accordance with the present system) is that this improves disaster recovery, builds defenses against Denial of Service attacks, making the application portable (such that it can be quickly moved to a new infrastructure with little or no configuration).

The present invention can also take advantage of caching. Specifically, the XML schema can be completed after validation and then cached. When using requests with nested or sub-tree branches, the output of the lower sub-tree branch nodes can be cached. This advantageously reduces the energy expended on computer calculations.

As stated above, incoming request 12 is preferably an XML document. Most preferably, incoming request 12 is an XML node with sub-tree branch nodes. An example of processing XML nodes having sub-tree branch nodes can be found in the inventor's own U.S. Pat. No. 7,464,226, entitled "Fractional Caching", incorporated herein by reference in its entirety. As described therein, the lower sub-tree branch nodes can advantageously be processed first such that the output of a lower sub-tree branch node becomes the input of an upper sub-tree branch node.

Preferably, the incoming request 12 has nested nodes therein. The XML data output of a lower node then becomes the input for the node above it in the XML tree. The larger the application gets, the more XML documents will pass through it and the more smart nodes it can have. There is no limit how many nodes can be nested below one another in XML. Therefore, complex data processing and flow control (e.g.: If/While/For loops) is possible. No matter how complex or large a document containing nested nodes is; the number of processing steps is no larger than the highest level of nesting. Moreover, the same node can appear at multiple locations both in the same document and different documents. If the output of the node is in the cache, the data can be made available for all. This means that the cache can be shared among different users and applications. The point of this programming methodology is to cache those steps that are repeated. In the case of an online commerce site, much of the page will be identical to all users, and updated only periodically. The smart nodes responsible for generating this part of the web page/XML document sent back to the client (browser) could be cached for this period.

A further advantage of the present invention is that different (valid and authorized) incoming requests 12 can be sent to different servers 140. Since servers 140 are preferably not application specific, different servers 140 can be brought on and off line at different times per computational load requirements. Moreover, the incoming requests 12 preferable contain or call up procedural logic such that a plurality of incoming requests emulate an application when the incoming requests are sent to the server which is not an application specific server.

"Green computing" involves more than simply keeping server farms cool, or sending data processing to different locations around the world. Ideally, "green computing" requires making the software itself more efficient. The efficiency is measured in work performed per electrical input. This can be optimized by running the equipment at maximum utilization. This is key to maximizing computational work per electrical load and achieving true green (i.e.: energy efficient) computing. The present invention allows more applications to share the same physical hardware while still keeping them logically separate from one another. Since there need not be any application-specific servers with the present system, all client requests can be routed to the same server. This results in large savings in setup and running costs. If more computing power is needed, additional computer servers can be added seamlessly to share the load.

The present system 100 thus operates as a "commoditized computing service" in which an application "running" on system 100 would in effect be virtualized. System 100 does not work on an "application" per se. Rather, it just does the work that comes in. The logic comes from the client's incoming requests 12 (through a browser, application or data source the client is invoking), and is not resident on the server(s) 140. The ability to process smart requests that contain or call up their own procedural logic amounts to the present system 100 emulating applications. This is because the application in the form of a collection of code running on a platform waiting to be invoked by clients, does not exist.

The incoming request 12 can contain combinations of simpler requests, with logic on how they are to be weaved together, making the request smarter. The user requests will include (or refer to) all relevant application logic (as opposed to the server having the relevant application logic). The ability of system 100 to process smart requests containing their own logic amounts to system 100 emulating complete applications an appearing for all practical purposes as an application server. System 100 will not host application specific code. Instead, it will process application work, the details of which will be contained in the incoming requests 12. Thus, system 100 can then be used as a single computational pool available to all. System 100 need not run on one physical server 140. Rather, it can run on any number of servers 140 sufficient for the load, with load balanced access. Thus, average utilization can stay high across arbitrarily wide swings in requests. With servers being switched of and on as needed to keep the average utilization as close to 100% as possible.

The present invention provides a system that is commoditized, as opposed to customized, so any application can use it. This any-purpose computing platform is perfect for application service providers. It is an application platform that can be shared among their customers. A device optimized to run XML (e.g.: XSLT processing embedded in hardware) would be ideal, with the programming language being XSL.

What is claimed is:

1. A method of enforcing web security, comprising:
   receiving an incoming request;
   parsing and analyzing the incoming request in comparison with a plurality of user-specific XML schemas to the incoming request to determine whether the incoming request corresponds to a pre-determined syntax, structure and content, wherein requests that are not authorized for the user are in violation of the user-specific XML schema and wherein requests that are authorized for the user are not in violation of the user-specific XML schema, and thereby:
   validating the incoming request and determining whether the incoming request is authorized, wherein the validating and authenticating is carried out in a single operation by determining whether the incoming request has the proper syntax, structure and content to satisfy the applied plurality of user-specific XML schemas;
   processing the incoming request after determining that the incoming request is both valid and authorized, sending the incoming request to an authenticator for authorization wherein after determining that the incoming request is valid but not authorized, and terminating operation on the incoming request if the incoming request is not valid.

2. The method of claim 1, wherein applying a plurality of user-specific XML schema to the incoming request comprises:

applying at least one default schema to the unauthenticated incoming request.

3. The method of claim 1, wherein applying a plurality of user-specific XML schema to the incoming request comprises:

applying at least one user-specific schema to the authenticated incoming request.

4. The method of claim 1, wherein the incoming request is an XML document.

5. The method of claim 1, wherein the incoming request is an XML node with sub-tree branch nodes.

6. The method of claim 1, wherein processing the incoming request if the incoming request is both valid and authorized comprises:

sending the incoming request to a server which is not an application specific server.

7. The method of claim 1, wherein determining whether the incoming request is to be authorized comprises:

the incoming request satisfying the requirements of the applied user-specific XML schema.

8. The method of claim 1, wherein the user-specific XML schema are completed after validation and then cached.

* * * * *